US012591289B2

(12) United States Patent
Shao et al.

(10) Patent No.: US 12,591,289 B2
(45) Date of Patent: Mar. 31, 2026

(54) METHODS, INTERNET OF THINGS SYSTEMS, AND STORAGE MEDIUM FOR MANAGING ENERGY- SAVING EARLY WARNING OF SMART GAS FLOWMETERS

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 189 days.

(21) Appl. No.: 18/539,229

(22) Filed: Dec. 13, 2023

(65) Prior Publication Data

US 2024/0134437 A1     Apr. 25, 2024

(30) Foreign Application Priority Data

Nov. 14, 2023     (CN) .......................... 202311523592.0

(51) Int. Cl.
*G06F 1/3212*          (2019.01)
*G08B 21/18*           (2006.01)

(52) U.S. Cl.
CPC ......... *G06F 1/3212* (2013.01); *G08B 21/182* (2013.01)

(58) Field of Classification Search
CPC ................................................... G06F 1/3212
See application file for complete search history.

(56) References Cited

U.S. PATENT DOCUMENTS

| | | | | |
|---|---|---|---|---|
| 9,880,611 | B2 * | 1/2018 | Zha ........................ | G06F 1/3287 |
| 2003/0158609 | A1 * | 8/2003 | Chiu ..................... | G06F 1/3203 |
| | | | | 700/22 |
| 2015/0338469 | A1 * | 11/2015 | Lee ........................ | G06F 11/324 |
| | | | | 324/427 |
| 2020/0174437 | A1 * | 6/2020 | Hu .......................... | G06N 20/00 |

(Continued)

FOREIGN PATENT DOCUMENTS

| | | |
|---|---|---|
| CN | 204517489 U | 7/2015 |
| CN | 207502002 U | 6/2018 |

(Continued)

*Primary Examiner* — Raymond N Phan
(74) *Attorney, Agent, or Firm* — METIS IP LLC

(57) ABSTRACT

A method for managing energy-saving early warning of a smart gas flowmeter is provided. The method is executed by a smart gas management platform. The method comprises obtaining a remaining power of the smart gas flowmeter, determining a confidence level of the remaining power based on at least environmental data, determining a calibrated power by calibrating the remaining power based on the confidence level, determining whether to issue a power alert to a gas user based on the calibrated power, operation data of the smart gas flowmeter, and at least one reference correspondence. The reference correspondence represents a relationship between an operation behavior of the smart gas flowmeter and a power consumption. The method also comprises generating an energy-saving management and operation scheme of the smart gas flowmeter in response to a determination that the power alert is issued to the gas user.

17 Claims, 4 Drawing Sheets

100

(56)          References Cited

U.S. PATENT DOCUMENTS

| | | | | |
|---|---|---|---|---|
| 2022/0136881 A1* | 5/2022 | Huang | .................... | F17C 13/04 |
| | | | | 73/204.23 |
| 2023/0344704 A1* | 10/2023 | Descombes | ....... | H04W 52/0258 |

FOREIGN PATENT DOCUMENTS

| | | | |
|---|---|---|---|
| CN | 209514770 | U | 10/2019 |
| CN | 114526779 | A | 5/2022 |

* cited by examiner

100

200

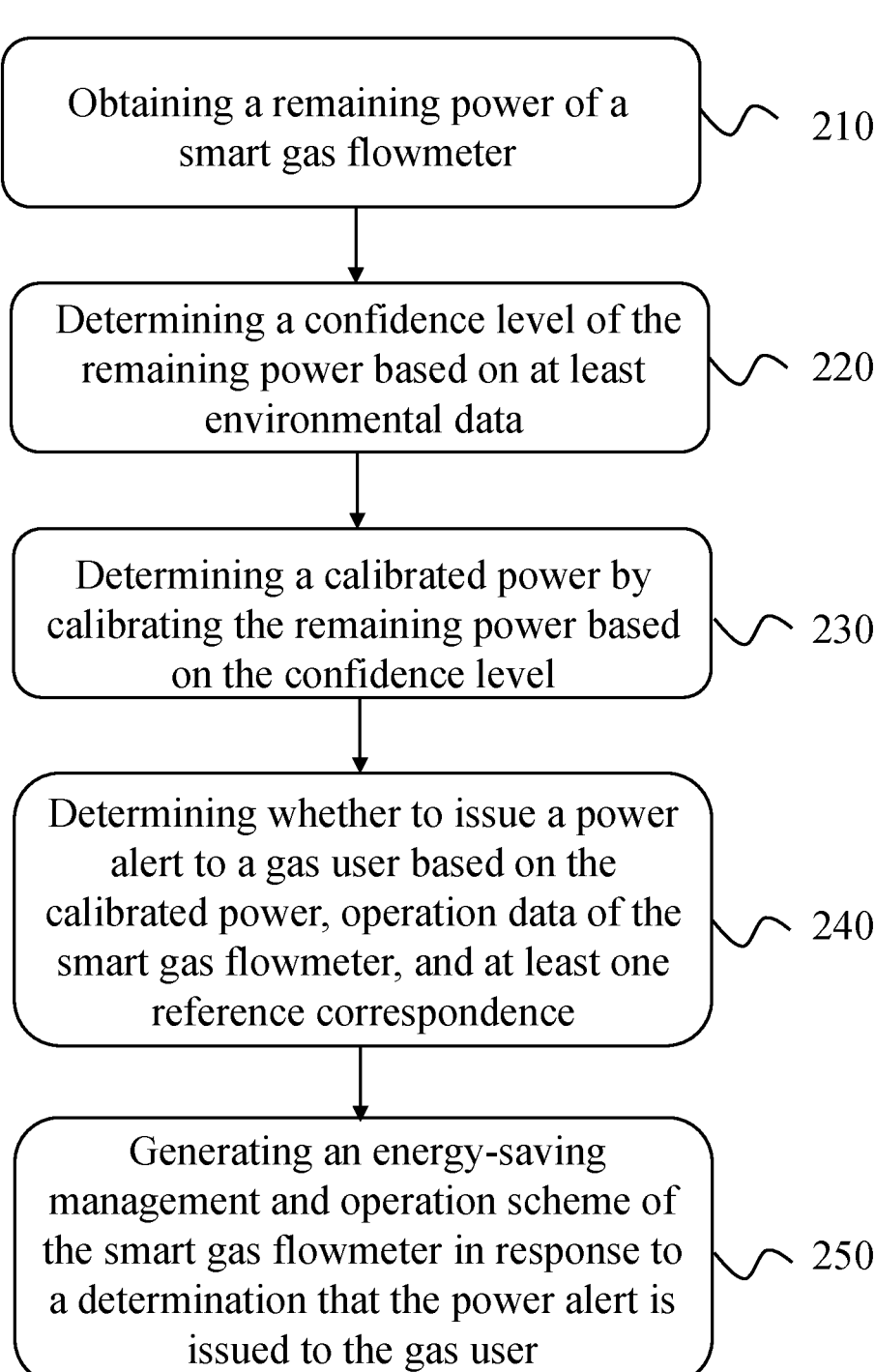

Obtaining a remaining power of a smart gas flowmeter — 210

Determining a confidence level of the remaining power based on at least environmental data — 220

Determining a calibrated power by calibrating the remaining power based on the confidence level — 230

Determining whether to issue a power alert to a gas user based on the calibrated power, operation data of the smart gas flowmeter, and at least one reference correspondence — 240

Generating an energy-saving management and operation scheme of the smart gas flowmeter in response to a determination that the power alert is issued to the gas user — 250

FIG. 2

METHODS, INTERNET OF THINGS SYSTEMS, AND STORAGE MEDIUM FOR MANAGING ENERGY- SAVING EARLY WARNING OF SMART GAS FLOWMETERS

CROSS REFERENCE TO RELATED APPLICATIONS

This application claims priority to Chinese application No. 202311523592.0, filed on Nov. 14, 2023, and the entire contents of which are incorporated herein by reference.

TECHNICAL FIELD

The present disclosure relates to the field of energy-saving of a smart gas flowmeter, and in particular, to a method and an Internet of Things system for managing energy-saving early warning of a smart gas flowmeter.

BACKGROUND

A smart gas flowmeter is a device used to measure the flow of pipeline gas, which is widely used in the management of gas metering of urban gas pipeline networks. Types of smart gas flowmeters include gas ultrasonic flowmeters, gas turbine flowmeters, Roots flowmeters, smart membrane gas meters, ultrasonic gas meters, etc., and most of the smart gas flowmeters are battery-powered. However, in the event of low power, the smart gas flowmeter experiences a decrease in the internal battery voltage, which leads to an automatic closure of a gas valve, resulting in the cessation of gas output and inconvenience for a gas user of the smart gas flowmeter. If the battery can be replaced in time, the smart gas flowmeter can maintain a gas supply state, thereby avoiding the inconvenience for the gas user.

Regarding the energy-saving management of smart gas flowmeters, Chinese application No. CN114526779A discloses a gas meter with lithium battery power monitoring functionality. In the prior art, lithium battery power monitoring is achieved through a circuit integrated into the gas meter for monitoring the power of the lithium battery. However, the prior art only considered energy-saving by monitoring the power of the lithium battery, but did not manage energy-saving warnings for smart gas flowmeters including gas meters from a data processing perspective.

Therefore, it is desired to provide a method and an Internet of Things (IoT) system for managing energy-saving early warning of a smart gas flowmeter, which is capable of efficiently and accurately detecting the power of a smart gas flowmeter, providing timely and reliably warning about the power of the smart gas flowmeter, and avoiding situations that batteries with remaining power are prematurely discarded due to inaccurate power assessments, thereby achieving the purpose of energy-saving of the smart gas flowmeter.

SUMMARY

One or more embodiments of the present disclosure provide a method for managing energy-saving early warning of a smart gas flowmeter, which is executed by a smart gas management platform. The method comprises obtaining a remaining power of the smart gas flowmeter, determining a confidence level of the remaining power based on at least environmental data, determining a calibrated power by calibrating the remaining power based on the confidence level, determining whether to issue a power alert to a gas user based on the calibrated power, operation data of the smart gas flowmeter, and at least one reference correspondence. The reference correspondence represents a relationship between an operation behavior of the smart gas flowmeter and a power consumption. The method also comprises generating an energy-saving management and operation scheme of the smart gas flowmeter in response to a determination that the power alert is issued to the gas user.

One or more embodiments of the present disclosure provide an Internet of Things system for managing energy-saving early warning of a smart gas flowmeter. The IoT system comprises a smart gas user platform, a smart gas service platform, a smart gas management platform, a smart gas sensor network platform, and a smart gas object platform interacting in sequence. The smart gas management platform is configured to obtain a remaining power of the smart gas flowmeter, determine a confidence level of the remaining power based on at least environmental data, determine a calibrated power by calibrating the remaining power based on the confidence level, determine whether to issue a power alert to a gas user based on the calibrated power, operation data of the smart gas flowmeter, and at least one reference correspondence. The reference correspondence represents a relationship between an operation behavior of the smart gas flowmeter and a power consumption. The smart gas management platform is also configured to generate an energy-saving management and operation scheme of the smart gas flowmeter in response to a determination that the power alert is issued to the gas user.

One or more embodiments of the present disclosure provide a computer-readable storage medium. The storage medium stores computer instructions, and when the computer reads the computer instructions in the storage medium, the computer executes a method for managing energy-saving early warning of a smart gas flowmeter.

Some embodiments of the present disclosure achieve at least the following technical effect: by obtaining the remaining power of the smart gas flowmeter, determining the confidence level of the remaining power based on the environmental data, calibrating the remaining power, determining the calibrated power, determining whether to issue the power alert to the gas user based on the calibrated power, operation data of the smart gas flowmeter and the at least one reference correspondence, and generating the energy-saving management and operation scheme in response to a determination that the power alert is issued to the gas user, the power of the smart gas flowmeter may be effectively and accurately detected, the power of the smart gas flowmeter may also be timely and reliably warned, and an appropriate energy-saving management and operation scheme may be generated to effectively achieve energy-saving of the smart gas flowmeter.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 2 is a flowchart illustrating an exemplary method for managing energy-saving early warning of a smart gas flowmeter according to some embodiments of the present disclosure;

DETAILED DESCRIPTION

Figure 1:
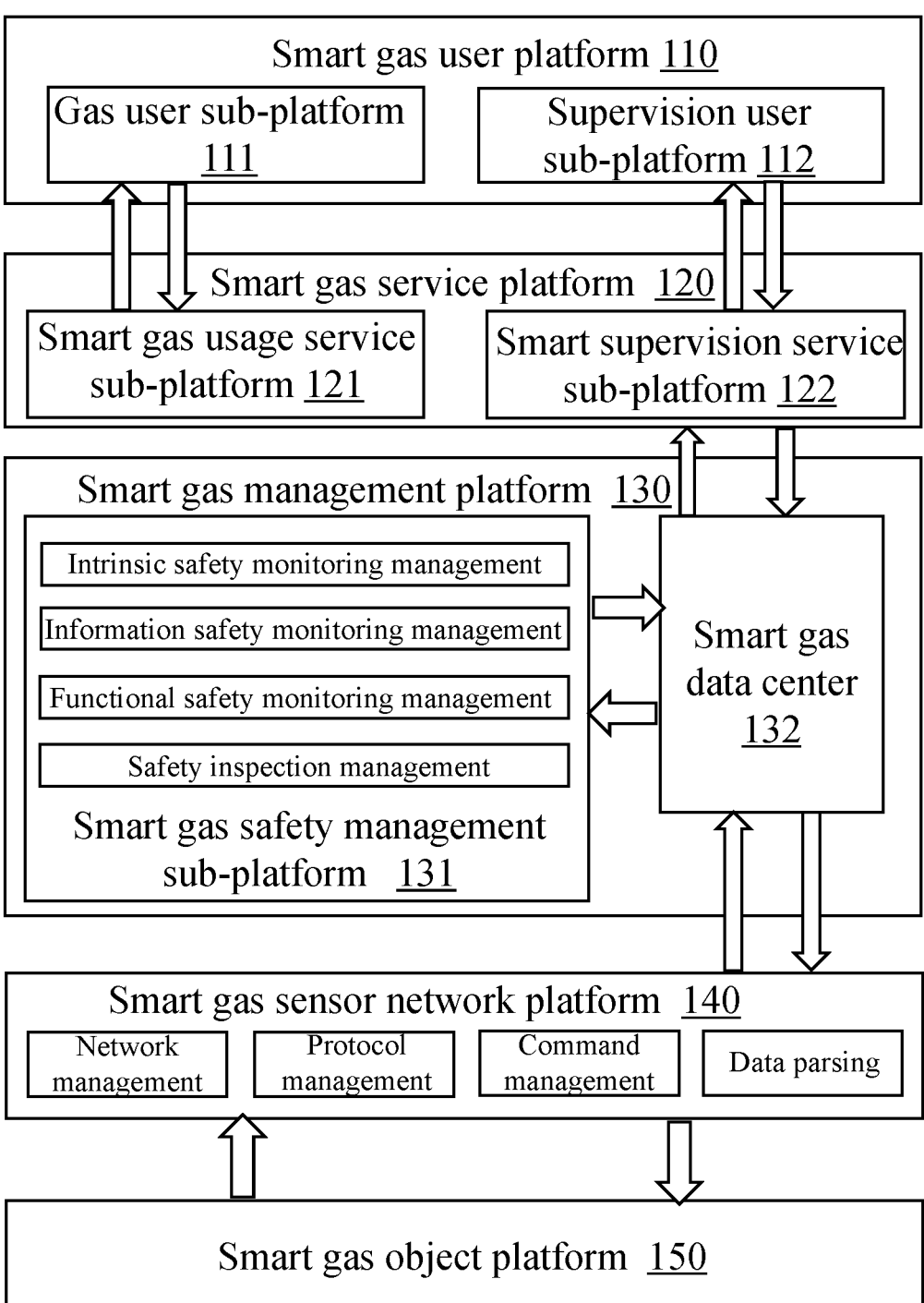
FIG. 1 is a schematic diagram illustrating an exemplary platform structure of an Internet of Things system for managing energy-saving early warning of a smart gas flowmeter according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with the accompanying drawings without creative labor. Unless obviously obtained from the context or the context illustrates otherwise, the same numeral in the drawings refers to the same structure or operation.

It should be understood that the terms "system", "device" as used herein, "unit" and/or "module" as used herein is a way to distinguish between different components, elements, parts, sections or assemblies at different levels. However, the words may be replaced by other expressions if other words accomplish the same purpose.

As shown in the present disclosure and the claims, unless the context clearly suggests an exception, the words "one," "an", "a", and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps can be processed in reverse order or simultaneously. Also, it is possible to add other operations to these processes, or to remove a step or steps from these processes.

FIG. 1 is a schematic diagram illustrating an exemplary platform structure of an Internet of Things system for managing energy-saving early warning of a smart gas flowmeter according to some embodiments of the present disclosure. The Internet of Things system for managing energy-saving early warning of a smart gas flowmeter covered by the embodiments of the present disclosure will be described in detail below. It should be noted that the following embodiments are used only for explaining the present disclosure and do not constitute a limitation of the present disclosure.

In some embodiments, an Internet of Things system 100 for managing energy-saving early warning of a smart gas flowmeter (hereinafter referred to as the energy-saving Internet of Things (IoT) system 100) may comprise a smart gas user platform 110, a smart gas service platform 120, a smart gas management platform 130, a smart gas sensor network platform 140, and a smart gas object platform 150.

The smart gas user platform 110 is a platform for interacting with a user. In some embodiments, the smart gas user platform 110 may be configured as a terminal device.

In some embodiments, the smart gas user platform 110 may include a gas user sub-platform 111 and a supervision user sub-platform 112.

The gas user sub-platform 111 is a platform that provides a gas user with data related to gas usage and a solution to a gas problem. The gas user includes an industrial gas user, a commercial gas user, and a general gas user, etc.

The supervision user sub-platform 112 is a platform for a supervision user to supervise an operation of the entire energy-saving IoT system 100. The supervision user includes personnel of a safety management department, etc.

In some embodiments, the smart gas user platform 110 may send a query command for gas device parameter information (e.g., a remaining power of the smart gas flowmeter, etc.) to the smart gas management platform 130 via the smart gas service platform 120, and receive a gas device management scheme (e.g., an energy-saving management and operation scheme, etc.) uploaded by the smart gas service platform 120.

The smart gas service platform 120 is a platform used to communicate the user's needs and control information. The smart gas service platform 120 may obtain gas device management information from the smart gas management platform 130 and upload the gas device management information to the smart gas user platform 110.

In some embodiments, the smart gas service platform 120 may include a smart gas usage service sub-platform 121 and a smart regulation service sub-platform 122.

The smart gas usage service sub-platform 121 is a platform providing the gas user with a gas service.

The smart supervision service sub-platform 122 is a platform providing a supervision need for the supervision user.

In some embodiments, the smart gas service platform 120 may send the gas device management scheme to the supervision user sub-platform 112 based on the smart supervision service sub-platform 122.

The smart gas management platform 130 is a platform used to monitor and manage the safety of each device and related information and aggregates all data of the IoT system and provides safety management and information management functions for an operation of the IoT system.

In some embodiments, the smart gas management platform 130 may include a smart gas safety management sub-platform 131 and a smart gas data center 132.

The smart gas safety management sub-platform 131 is a platform for processing information related to the safety of devices of an object platform. In some embodiments, the smart gas safety management sub-platform 131 includes four safety monitoring management modules: intrinsic safety monitoring management, information safety monitoring management, functional safety monitoring management, and safety inspection management. The smart gas safety management sub-platform 131 may analyze and process safety information related to the devices of the object platform by means of each of the aforementioned modules.

The smart gas data center 132 may be used to store and manage operation information of the energy-saving IoT system 100. In some embodiments, the smart gas data center 132 may be configured as a storage device for storing gas device-related data, etc.

In some embodiments, the intrinsic safety monitoring management includes monitoring of mechanical leakage, electrical power consumption (e.g., smart control power consumption, communication power consumption, etc.), valve control, and other explosion-proof safety. The information safety monitoring management includes monitoring of data anomalies, illegal device information, and illegal access, etc. The functional monitoring management includes functional safety monitoring for conditions such as prolonged inactivity, sustained flow timeouts, flow overloads, unusually high or low flow rates, low air pressure, strong magnetic interference, and low voltage, etc. In some embodiments, the smart gas data center may automatically send obtained relevant safety data to a corresponding safety monitoring management module by identifying a category of safety parameters. Each safety monitoring management module is preset with a corresponding safety monitoring threshold. When the relevant safety data exceeds the corresponding safety monitoring threshold, the smart gas data center may automatically alarm on the smart gas management platform, and optionally push alarm information to the gas user and the supervision user automatically.

In some embodiments, the smart gas management platform 130 may interact with the smart gas service platform 120 and the smart gas sensor network platform 140 through the smart gas data center 132, respectively. For example, the smart gas data center 132 may send the gas device management scheme to the smart gas service platform 120. As another example, the smart gas data center may send the query command for the gas device parameter information to the smart gas sensor network platform 140 to obtain the gas device parameter information.

The smart gas sensor network platform 140 may be a functional platform for network management of sensor communications. In some embodiments, the smart gas sensor network platform 140 may be configured as a communication network and gateway that performs functions such as network management, protocol management, command management, and data parsing. In some embodiments, the smart gas sensor network platform 140 may interact with the smart gas management platform 130 and the smart gas object platform 150 for information. For example, the smart gas sensor network platform 140 may receive the gas device parameter information uploaded by the smart gas object platform 150, and/or issue a command for obtaining the gas device parameter information to the smart gas object platform 150.

The smart gas object platform 150 may be a functional platform for sensing information generation and controlling information execution. In some embodiments, the smart gas object platform 150 may be configured as various types of gas metering and management devices. The gas metering and management devices may include a gas ultrasonic flowmeter, a gas turbine flowmeter, a Roots flowmeter, a smart membrane gas meter, an ultrasonic gas meter, a gas valve, or the like.

In some embodiments, the smart gas object platform 150 may interact with the smart gas sensor network platform 140 for receiving the command for obtaining the gas device parameter information issued by the smart gas sensor network platform 140, and also may be used to upload the gas device parameter information to the smart gas sensor network platform 140.

Some embodiments of the present disclosure, based on the energy-saving IoT system 100, can form a closed loop of information operation between the smart gas object platform and the smart gas user platform, and coordinate and operate regularly under the unified management of the smart gas management platform, henceforth realizing the informationaztion and intellectualization of the energy-saving management of the smart gas flowmeter.

FIG. 2 is a flowchart illustrating an exemplary method for managing energy-saving early warning of a smart gas flowmeter according to some embodiments of the present disclosure. As shown in FIG. 2, a process 200 includes following steps. In some embodiments, the process 200 may be performed by a smart gas management platform.

Step 210, obtaining a remaining power of the smart gas flowmeter.

In some embodiments, the remaining power of the smart gas flowmeter may be directly determined by a power obtaining module of the smart gas flowmeter. The power obtaining module is used to obtain power data of the smart gas flowmeter. For example, the power data of the smart gas flowmeter may include a utilized power of the smart gas flowmeter, the remaining power of the smart gas flowmeter, or the like.

Step 220, determining a confidence level of the remaining power based on at least environmental data.

The environmental data is data related to an environment around the smart gas flowmeter. For example, the environmental data may be temperature data, humidity data, light intensity data, etc.

In some embodiments, the environmental data may be obtained by detection of a sensor. Types of the sensor include, but are not limited to, a temperature sensor, a humidity sensor, and a light intensity sensor.

The confidence level of the remaining power is used to measure a credibility level of the remaining power. The higher the confidence level, the closer the obtained remaining power is to an actual remaining power, that is, the more credible the obtained remaining power is.

It should be understood that the environmental data may affect the operation quality of various components of the smart gas flowmeter, or even cause a malfunctioning of the smart gas flowmeter, rendering the obtained remaining power inaccurate. In some embodiments, the smart gas management platform may determine the confidence level of the remaining power based on the environmental data and a confidence level comparison table. The confidence level comparison table records confidence levels of remaining powers corresponding to different environmental data. The confidence level comparison table may be obtained based on a prior knowledge or preset based on historical data. For example, when a temperature, humidity, and light intensity of the environmental data are too high, a probability of battery leakage of a battery of the smart gas flowmeter is high, and a remaining power obtained at this time may not be accurate. Correspondingly, a confidence level of the remaining power corresponding to such environmental data may be a lower value.

In some embodiments, the smart gas management platform may determine the confidence level by processing the environmental data and historical usage data of the smart gas flowmeter using a confidence level determination model.

In some embodiments, the confidence level determination model is a machine learning model. In some embodiments, the confidence level determination model may include a Recurrent Neural Network (RNN) model, a Deep Neural Network (DNN) model, Convolutional Neural Network (CNN) model, and any one or combination of various feasible models.

In some embodiments, an input to the confidence level determination model may include the environmental data and the historical usage data of the smart gas flowmeter, and an output may be the confidence level of the remaining power.

The historical usage data of the smart gas flowmeter refers to a data situation of the smart gas flowmeter during historical usage. For example, the historical usage data of the smart gas flowmeter may include a service year of the smart gas flowmeter, a count of repairs of the smart gas flowmeter, etc.

Parameters of the confidence level determination model may be obtained through training. In some embodiments, the confidence level determination model may be obtained by training a plurality of first training samples with a first label. For example, the plurality of first training samples with the first label may be input into an initial confidence level determination model, then a loss function is constructed based on the first label and a result of the initial confidence level determination model, and parameters of the initial confidence level determination model are iteratively updated based on the loss function. A model training is completed when the loss function of the initial confidence level determination model satisfies a preset condition, and a trained confidence level determination model is obtained. The preset condition may be that the loss function converges, a count of iterations reaches a threshold, etc.

In some embodiments, the first training sample may include sample environmental data of a sample smart gas flowmeter and historical usage data of the sample smart gas flowmeter. The first label may be a confidence level of a sample remaining power of the sample smart gas flowmeter. The sample remaining power is a remaining power obtained of the sample smart gas flowmeter.

In some embodiments, the first training sample and the first label may be obtained based on historical data. In some embodiments, the smart gas management platform may determine historical environmental data of a normal smart gas flowmeter and historical usage data of the normal smart gas flowmeter as positive samples in the first training sample, and determine historical environmental data of an anomalous smart gas flowmeter, and historical usage data of the anomalous smart gas flowmeter as negative samples in the first training sample. For example, a first label of the positive sample is 1, which indicates that the obtained remaining power is the same or similar to the actual remaining power. A first label of the negative sample is a value except 1, which indicates that the obtained remaining power is different or not similar to the actual remaining power.

The normal smart gas flowmeter is a smart gas flowmeter that has not undergone an abnormal situation, and an actual remaining power of the normal smart gas flowmeter is the same or similar to a remaining power obtained by the power obtaining module. The anomalous smart gas flowmeter is a smart gas flowmeter in which an abnormal situation has occurred, and an actual remaining power of the anomalous smart gas flowmeter is different from or not similar to a remaining power obtained by the power obtaining module.

In some embodiments, a type of the abnormal situation includes, but is not limited to, battery anomalies, reading anomalies (e.g., a deterioration in the performance of the power obtaining module resulting in the remaining power obtained being different from, or not similar to, the actual remaining power), or the like.

In some embodiments, the smart gas management platform may determine a confidence level corresponding to the anomalous smart gas flowmeter based on historical anomaly data of a plurality of anomalous smart gas flowmeters. Anomalous smart gas flowmeters with a same anomaly type have the same confidence level. The confidence level corresponding to the anomalous smart gas flowmeter may indicate a proximity degree between an obtained remaining power of the anomalous smart gas flowmeter and an actual remaining power of the anomalous smart gas flowmeter.

In some embodiments, the historical anomaly data includes the anomaly type, a time point of an anomaly, and a remaining power obtained at a plurality of time points before and after the anomaly. The historical anomaly data may be obtained based on an energy-saving IoT system.

In some embodiments, the smart gas management platform may obtain a large number of historical anomaly datasets of anomalous smart gas flowmeters based on the energy-saving IoT system, determine an impact degree of at least one anomaly type based on the historical anomaly datasets, and determine a confidence level of the at least one anomaly type of the anomalous smart gas flowmeter based on the impact degree of the at least one anomaly type.

The historical anomaly dataset includes historical anomaly data of a plurality of anomalous smart gas flowmeters.

In some embodiments, the smart gas management platform may categorize the historical anomaly dataset according to the anomaly type and obtain a historical anomaly data sub-set corresponding to the at least one anomaly type. The smart gas management platform may also determine an impact degree of each anomaly type based on a historical anomaly data sub-set corresponding to each anomaly type of the at least one anomaly type. For example, for a historical anomaly data sub-set corresponding to any one of the anomaly types, the smart gas management platform may calculate a standard deviation of historical remaining powers obtained by each anomalous smart gas flowmeter at a plurality of time points before and after a time point of an anomaly, and determine an average value of standard deviations of historical remaining powers of all anomalous smart gas flowmeters in an anomaly type as an impact degree of the anomaly type. In this embodiment, the average value of the standard deviations of the historical remaining powers may reflect a fluctuation degree of the historical remaining powers obtained under one anomaly type, and the larger the average value of the standard deviations of the historical remaining powers, the larger the fluctuation degree.

In some embodiments, the smart gas management platform may determine the confidence level of the anomalous smart gas flowmeter by checking a table based on a confidence level lookup table and the anomaly type of the anomalous smart gas flowmeter, then determine related data of the anomalous smart gas flowmeter as the first label of the first training sample. The confidence level lookup table includes a correspondence between impact degrees of different anomaly types and confidence levels of anomalous smart gas flowmeters of different anomaly types. The confidence level lookup table may be obtained based on historical data or preset based on priori knowledge.

In some embodiments of the present disclosure, processing the environmental data and the historical usage data of the smart gas flowmeter, and determining the confidence level based on the confidence level determination model can utilize the self-learning capability of the machine learning model to find a law and obtain a correlation relationship between the environmental data, the historical usage data, and the confidence level of the remaining power of the smart gas flowmeter from a large number of historical anomaly datasets, thereby improving the accuracy and efficiency of determining the confidence level.

Step 230, determining a calibrated power by calibrating the remaining power based on the confidence level.

The calibrated power is a remaining power of the smart gas flowmeter after being calibrated.

In some embodiments, the smart gas management platform may determine an adjustment amount based on the confidence level, and determine the calibrated power based on the remaining power of the smart gas flowmeter and the adjustment amount. For example, the calibrated power may be equal to a sum of the remaining power and the adjustment amount.

In some embodiments, the smart gas management platform may preset a correspondence between the confidence level and the adjustment amount, and determine the adjustment amount based on the correspondence and the confidence level of the remaining power of the smart gas flowmeter. For example, the correspondence between the confidence level and the adjustment amount may be such that the higher the confidence level, the smaller the adjustment amount.

In some embodiments, the smart gas management platform may also determine whether to calibrate the remaining power based on the confidence level. For example, when the confidence level is below a confidence level threshold, it is determined to calibrate the remaining power. The confidence level threshold may be a value preset by the system or human.

Step 240, determining whether to issue a power alert to a gas user based on the calibrated power, operation data of the smart gas flowmeter, and at least one reference correspondence.

The operation data of the smart gas flowmeter is data related to an operation of the smart gas flowmeter. In some embodiments, the operation data of the smart gas flowmeter includes at least one operation behavior occurred and a behavior data amount and/or a behavior duration of the smart gas flowmeter from the battery of the smart gas flowmeter being fully charged to the present.

The operation behavior refers to a behavior during the operation of the smart gas flowmeter. In some embodiments, the operation behavior may include sending data, receiving data, keeping the smart gas flowmeter in operation, or the like. Keeping the smart gas flowmeter in operation indicates only maintaining a basic operation of the smart gas flowmeter without receiving and sending data.

Due to receiving or sending different types of data, the smart gas flowmeter needs to run different components, and an operation frequency and operation time of the components may be different, and correspondingly, a power consumption may be different. Correspondingly, in some embodiments, different types of operation behaviors of the smart gas flowmeter may be classified depending on data type of data being sent and/or received.

In some embodiments, the data type may be preset in advance. In some embodiments, the data type may be classified based on the use of data. For example, the data type may be malfunctioning data, usage data, maintenance data, environmental inspection data, or the like.

In some embodiments, the behavior data amount refers to an amount of data sent and/or an amount of data received due to the operation behavior of the smart gas flowmeter.

In some embodiments, the smart gas management platform may interact with a smart gas object platform via a smart gas sensor network platform to obtain the operation data of the smart gas flowmeter.

In some embodiments, the reference correspondence indicates a relationship between the operation behavior of the smart gas flowmeter and the power consumption. The power consumption may or may not be the same for different operation behaviors.

In some embodiments, the reference correspondence indicates a relationship between the operation behavior of the smart gas flowmeter and a power consumption per unit time. The power consumption per unit time may or may not be the same for different operation behaviors.

In some embodiments, the at least one reference correspondence may be obtained based on a priori knowledge or historical data.

In some embodiments, the smart gas management platform may preset the at least one reference correspondence based on historical aggregate operation data of the smart gas flowmeter.

The historical aggregate operation data of the smart gas flowmeter refers to at least one operation behavior occurred and a behavior data amount and a behavior duration of smart gas flowmeters of a large amount of gas users from a battery of the smart gas flowmeter being full charged to the issuance of the power alert.

In some embodiments, the smart gas management platform may obtain the historical aggregate operation data of the smart gas flowmeter through an Internet of Things system for managing energy-saving early warning of a smart gas flowmeter.

In some embodiments, the smart gas management platform may statistically analyze the historical aggregate operation data of the smart gas flowmeter, obtain a power consumption (or a power consumption per unit time) corresponding to at least one operation behavior, and obtain the at least one reference correspondence.

In some embodiments, the smart gas management platform may determine, based on the historical aggregate operation data of the smart gas flowmeter, a power consumption per unit time for maintaining the smart gas flowmeter in operation, and based on an experimental test, determine a power consumption per unit time of a remaining operation behavior.

In some embodiments, the smart gas management platform may filter historical operation data that satisfies a preset condition in the historical aggregate operation data, and based on a full power of a battery of a smart gas flowmeter, a power threshold, and a time between the battery of the smart gas flowmeter reducing from the full power to the power threshold in the historical operation data, determine the power consumption per unit time to maintain the smart gas flowmeter in operation. The preset condition may include filtering historical operation data that only includes an operation behavior for maintaining the smart gas flowmeter in operation. For example, a following formula may be used to calculate the power consumption per unit time for maintaining the smart gas flowmeter in operation: (full power−power threshold)÷(T2−T1), wherein T2 is a time when the smart gas flowmeter issues the power alert (or reaches the power threshold), T1 is a time when the smart gas flowmeter starts to be used under a condition of full power. It may also be calculated by the same relevant formulas with the same logic of the above formula.

The remaining operation behavior is operation behaviors other than the operation behavior for maintaining the smart gas flowmeter in operation. For example, the remaining operation behavior may include sending data, receiving data, or the like.

In some embodiments, the smart gas management platform may determine, based on the experimental test, the power consumption per unit of the remaining operation behavior.

In some embodiments, the experimental test includes causing the smart gas flowmeter to perform a preset operation behavior based on a preset frequency until a battery voltage of the smart gas flowmeter drops from a voltage corresponding to the fully power to a preset voltage, then determining a power consumption per unit of the preset operation behavior.

In some embodiments, the preset operation behavior may be operation behaviors other than the operation behavior for maintaining the smart gas flowmeter in operation.

A test time is a time between the battery voltage of the smart gas flowmeter dropping from the voltage corresponding to the fully power to the preset voltage.

In some embodiments, the smart gas management platform may construct a conversion relationship between an operation voltage of the battery of the smart gas flowmeter and a power, determine a simulated remaining power corresponding to the preset voltage based on the conversion relationship, and determine the power consumption per unit of the preset operation behavior.

For example, if the operation voltage of battery of the smart gas flowmeter is from a highest operation voltage to a lowest operation voltage, the conversion relationship may be that the lowest operation voltage represents 0% power and the highest operation voltage represents 100% power. For example, the simulated remaining power corresponding to the preset voltage may be calculated according to a following formula: [(preset voltage–lowest operation voltage)÷(highest operation voltage–lowest operation voltage)]×full power of the battery of the smart gas flowmeter.

In some embodiments, the smart gas management platform may determine a total power consumption of the preset operation behavior based on the simulated remaining power, the test time, and the power consumption per unit time for maintaining the smart gas flowmeter in operation, and determine the power consumption per unit of the preset operation behavior based on the total power consumption of the preset operation behavior and an behavior data amount of the preset operation behavior during the test time. In the following, taking an operation behavior A as an example, a total power consumption of the operation behavior A may be first calculated according to a following formula: simulated remaining power–test time×power consumption per unit time, to maintain the smart gas flowmeter in operation, and a power consumption power unit of the operation behavior A is calculated according to a following formula: the total power consumption of the operation behavior A÷behavior data amount of the preset operation behavior during the test time.

The preset frequency is an operation frequency of the operation behavior set in advance.

The preset frequency, preset operation behavior, and preset voltage may be set by human or system.

In some embodiments, different preset voltages correspond to different preset operation behaviors. In some embodiments, the preset voltage may be determined based on the power consumption per unit of the preset operation behavior. For example, the larger the power consumption per unit, the larger the preset voltage corresponding to the preset operation behavior.

By calculating the power consumption per unit time of the operation behavior for maintaining the smart gas flowmeter in operation and the power consumption per unit time of the remaining operation behavior, respectively, through different calculation manners, power consumption situations of different operation behaviors can be obtained more accurately. In calculating the power consumption per unit, since the larger the power consumption per unit of the operation behavior is, the faster the battery voltage decreases. Therefore, at this time, the reliability of a manner for calculating a power through a voltage ratio may be reduced, and accurate data can be obtained by increasing the preset voltage appropriately.

The power alert is a warning alert sent to the gas user in case of an abnormal power. Circumstances of the abnormal power include when the remaining power is lower than a remaining power threshold, when an average daily power consumption is higher than a power consumption threshold, etc. The remaining power threshold and the power threshold may be a system default value, an empirical value, a human pre-set value, etc., or any combination thereof, which may be set according to an actual demand and is not limited by the present disclosure herein.

The power alert may be in the form of a bright light warning, an audible warning, an SMS warning, or the like.

In some embodiments, the power alert may be categorized according to a level. For example, a power alert level may correspond to different remaining power ranges.

In some embodiments, the power alert may be used to remind the gas user to replace the battery of the smart gas flowmeter. In some embodiments, the power alert may be used to remind the gas user to inspect and repair the battery of the smart gas flowmeter. The description of the power alert is only for illustration purposes, which is not limited herein.

In some embodiments, the smart gas management platform may determine whether to issue the power alert to the gas user based on the calibrated power and the power threshold. When the calibrated power level is lower than the power threshold, the power alert is issued to the gas user. The power threshold is a lowest power of the smart gas flowmeter. The power threshold may be preset by the system or by a human. More details of the power threshold may be found in FIG. 3, and the related descriptions thereof.

In some embodiments, the smart gas management platform may determine a battery reference runtime of the smart gas flowmeter, and determine whether to issue the power alert to the gas user based on the battery reference runtime and a time threshold. More details of this embodiment may be found in detail in FIG. 3 and the related descriptions thereof.

Step 250, generating an energy-saving management and operation scheme of the smart gas flowmeter in response to a determination that the power alert is issued to the gas user.

The energy-saving management and operation scheme is a program related to the operation of smart gas flowmeter.

In some embodiments, the energy-saving management and operation scheme includes one or more operation behaviors. For example, the energy-saving management and operation scheme may be sending the malfunctioning data to the smart gas management platform, etc.

In some embodiments, the energy-saving management and operation scheme includes one or more operation behaviors and a behavior data amount and/or a behavior duration of the one or more operation behaviors. For example, the energy-saving management and operation scheme may include sending the malfunctioning data from the smart gas flowmeter to the smart gas management platform, and a data amount of data being sent may be A megabyte.

In some embodiments, the smart gas management platform may generate the energy-saving management and operation scheme based on the power alert level. Different power alert levels correspond to different energy-saving management and operation schemes, and a correspondence between the power alert level and the energy-saving management and operation scheme may be preset based on a priori knowledge or historical data. For example, a first power alert level indicates that the remaining power of the smart gas flowmeter is least, and an energy-saving management and operation scheme generated may be an operation behavior for only maintaining the smart gas flowmeter system in operation; a second power alert level indicates that the remaining power of the smart gas flowmeter is less, an energy-saving management and operation scheme generated may be an operation behavior for sending data with less data amount, etc.

In some embodiments, the smart gas management platform may determine an importance score of the operation behavior based on the at least one reference correspondence and an urgency degree of the operation behavior. The smart gas management platform may also generate the energy-saving management and operation scheme based on the importance score. More details of this embodiment can be found in detail in FIG. 4 and the related descriptions thereof.

Some embodiments of the present disclosure, by obtaining the remaining power of the smart gas flowmeter, determining the confidence level of the remaining power based on at least the environmental data, determining the calibrated power by calibrating the remaining power based on the confidence level, determining whether to issue the power alert to the gas user based on the calibrated power, the operation data of the smart gas flowmeter, and the at least one reference correspondence, and generating the energy-saving management and operation scheme of the smart gas flowmeter in response to a determination that the power alert is issued to the gas user, which can effectively and accurately detect the power of the smart gas flowmeter, timely and reliably warn the power of the smart gas flowmeter, and generate a suitable energy-saving management and operation scheme, thereby effectively realizing energy saving of the smart gas flowmeter.

It should be noted that the description of the process 200 is intended to be exemplary and illustrative only and does not limit the scope of application of the present disclosure. For a person skilled in the art, various corrections and changes may be made to the process 200 under the guidance of the present disclosure. However, these corrections and changes remain within the scope of the present disclosure.

Figure 3:
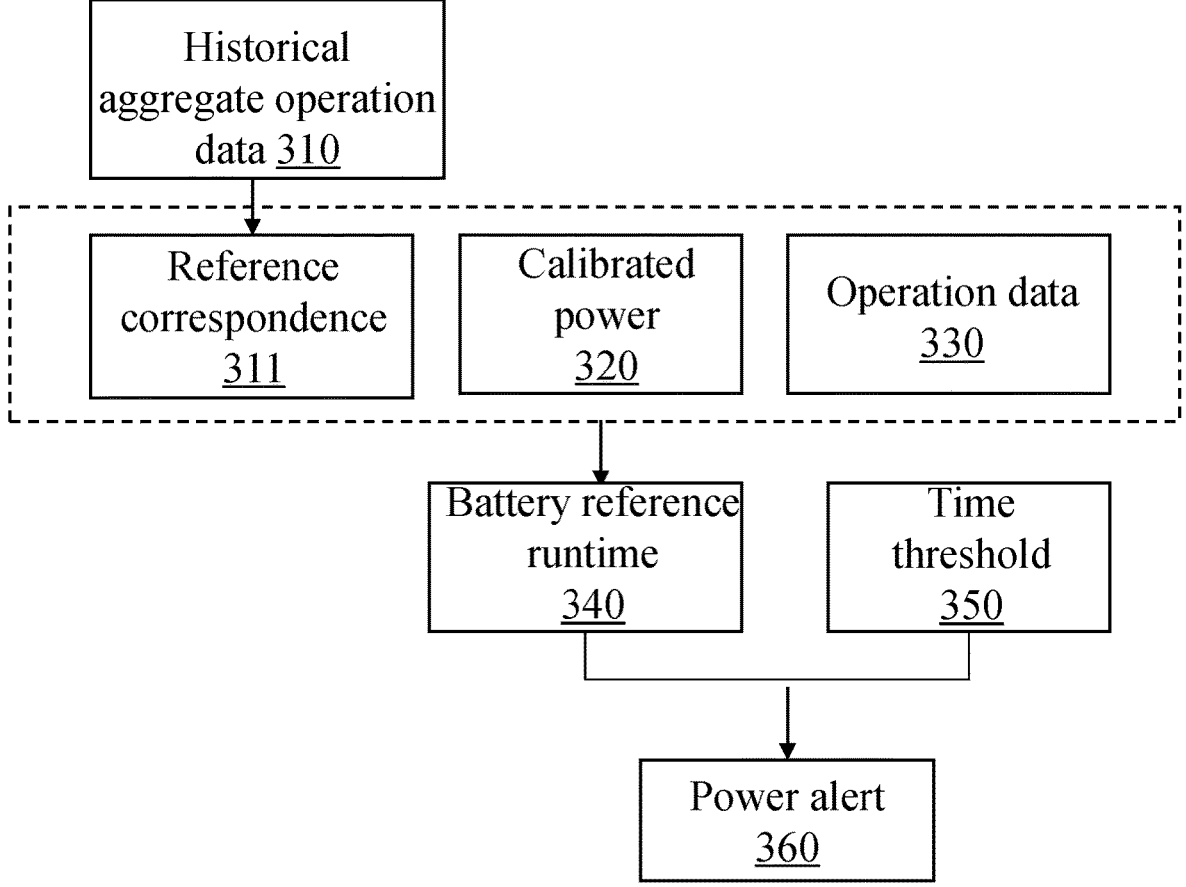
FIG. 3 is a schematic diagram illustrating an exemplary determination of issuing a power alert to a gas user according to some embodiments of the present disclosure.

FIG. 3 is a schematic diagram illustrating an exemplary determination of issuing a power alert to a gas user according to some embodiments of the present disclosure.

In some embodiments, a smart gas management platform may preset at least one reference correspondence 311 based on historical aggregate operation data 310 of a smart gas flowmeter, determine a battery reference runtime 340 of the smart gas flowmeter based on a calibrated power 320, operation data 330 of the smart gas flowmeter, and the at least one reference correspondence 311, and in response a determination that the battery reference runtime 340 is less than a time threshold 350, issue a power alert 360 to a gas user.

For details regarding presetting the at least one reference correspondence, the operation data of the smart gas flowmeter, please see FIG. 2 and its related description.

The battery reference runtime is a runnable time of the smart gas flowmeter.

In some embodiments, the smart gas management platform may determine, based on a reference time lookup table and the calibrated power of the smart gas flowmeter, a battery reference runtime corresponding to the calibrated power of the smart gas flowmeter by looking up a table. The reference time lookup table includes a correspondence between different powers and different battery reference runtimes, and the reference time lookup table may be determined based on a priori knowledge or historical data.

In some embodiments, the smart gas management platform may calculate an average daily power consumption of the gas user based on the operation data of the smart gas flowmeter, and determine the battery reference runtime based on the average daily power consumption, the calibrated power, and the power threshold. For example, the battery reference runtime=(calibrated power−power threshold)/the average daily power consumption of the gas user.

More details about the calibrated power can be found in FIG. 2 and the related descriptions thereof.

The average daily power consumption is an average power consumption per day of the gas user.

In some embodiments, the smart gas management platform may determine power consumptions corresponding to each of a plurality of operation behaviors included in the operation data of the smart gas flowmeter based on the operation data of the smart gas flowmeter and the at least one reference correspondence, obtain a total power consumption of the gas user, and determine the average daily power consumption of the gas user based on the total power consumption of the gas user and a count of usage days corresponding to the total power consumption. For example, when an operation behavior is "maintaining the smart gas flowmeter in operation," a corresponding power consumption is a product of a behavior duration of the operation behavior "maintaining the smart gas flowmeter in operation" and a power consumption per unit time. For example, if an operation behavior is "send data or receive data," a corresponding power consumption is a product of a behavior duration of the operation behavior "send data or receive data" and the power consumption per unit time.

The power threshold is a lowest power of the smart gas flowmeter. When a remaining power of the smart gas flowmeter is lower than the power threshold, the smart gas flowmeter may not maintain a normal operation. In some embodiments, the power alert may be sent to the gas user when the remaining power of the smart gas flowmeter is less than the power threshold.

In some embodiments, power thresholds of smart gas flowmeters corresponding to different gas users may be different.

In some embodiments, the power threshold may be determined based on a battery performance state of the smart gas flowmeter. For example, the worse the battery performance state of the smart gas flowmeter, the greater the power threshold. In some embodiments, the smart gas management platform may utilize a power threshold comparison table to determine the power threshold of the smart gas flowmeter based on the battery performance state of the smart gas flowmeter. Power thresholds corresponding to different battery performance states are recorded in the power threshold comparison table. The power threshold comparison table may be obtained based on a priori knowledge or preset based on historical data.

It should be understood that when the power of the smart gas flowmeter is too low, it may affect the battery performance state of the smart gas flowmeter. In the case where the battery performance state of the smart gas flowmeter is relatively poor, if the power threshold is relatively low, it is easy to cause the battery to fail, which may cause greater losses to the gas user in serious cases. Therefore, in the case of a smart gas flowmeter with a poor battery performance state, the power threshold may be set larger to reduce a probability of battery failure.

The battery performance state of the smart gas flowmeter is used to reflect a goodness degree of a current state of a battery of the smart gas flowmeter relative to a factory state. The better the battery performance state of the smart gas flowmeter, the closer the current state of the battery of the smart gas flowmeter is to the factory state. The battery performance state of the smart gas flowmeter may be expressed as a number, a percentage, or a text, and is not limited by the present disclosure.

In some embodiments, the smart gas management platform may determine the battery performance state of the smart gas flowmeter based on a service life of the battery of the smart gas flowmeter and a count of repairs. For example, the longer the service life and the more repairs, the worse the battery performance state.

In some embodiments, the smart gas management platform may determine the battery performance state of the smart gas flowmeter by looking up a performance state query table based on environmental data and battery data of the smart gas flowmeter. The battery data may include a capacity, an energy density, a charge/discharge multiplier, a self-discharge, an operation temperature range, or the like, of the battery. The performance state query table includes a correspondence between different environmental data, different battery data, and different battery performance states. The performance state query table may be obtained based on historical data or preset based on a prior knowledge.

In some embodiments, the smart gas management platform may predict the battery performance state of the smart gas flowmeter by processing the environmental data and the battery data of the smart gas flowmeter using a prediction model.

More details about the environmental data can be found in FIG. 2 and the related descriptions thereof.

The prediction model may be used to predict the battery performance state of the smart gas flowmeter. In some embodiments, the prediction model is a machine learning model. For example, the prediction model may be a DNN, a Support Vector Machines (SVM).

In some embodiments, an input to the prediction model may include the environmental data and the battery data of the smart gas flowmeter, and an output may be the probability of battery failure of the smart gas flowmeter.

In some embodiments, the battery performance state of the smart gas flowmeter may be determined based on the probability of the battery failure. For example, the higher the probability of the battery failure, the worse the battery performance state of the smart gas flowmeter.

The battery data of the smart gas flowmeter is data related to the battery of the smart gas flowmeter. For example, the battery data of the smart gas flowmeter may be capacity, energy density, charge/discharge multiplier, charge/discharge multiplier, self-discharge, operation temperature range, or the like.

Parameters of the prediction model may be obtained through training. In some embodiments, the prediction model may be obtained by training a plurality of second training samples with a second label. For example, the plurality of second training samples with the second label may be input into an initial prediction model, a loss function is constructed based on the second label and a result of the initial prediction model, and parameters of the initial prediction model are iteratively updated based on the loss function. A model training is completed when the loss function of the initial prediction model satisfies a preset condition, and a trained prediction model is obtained. The preset condition may be that the loss function converges, a count of iterations reaches a threshold, etc.

In some embodiments, the second training sample may include sample environmental data and battery data of a sample smart gas flowmeter. The second label may be a historical abnormal situation of a battery of the sample smart gas flowmeter. In some embodiments, the second training sample may be obtained based on historical data (e.g., historical environmental data and historical battery data of the smart gas flowmeter), and the second label may be obtained by manual labeling. For example, if the battery of the smart gas flowmeter is abnormal, the second label is denoted as 1; if the battery of the smart gas flowmeter is not abnormal, the second label is denoted as 0.

Some embodiments of the present disclosure, by processing the environmental data and the battery data of the smart gas flowmeter using the prediction model, predicting the probability of the battery failure of the smart gas flowmeter, and further determining the battery performance state of the smart gas flowmeter, the self-learning ability of the machine learning model can be utilized to find a law from a large number of historical data sets, obtain a correlation relationship between the environmental data, the battery data of the smart gas flowmeter, and the probability of battery failure of the smart gas flowmeter, and improve the accuracy and efficiency of determining the probability of battery failure. At the same time, calculating the average daily power consumption of the gas user based on the operation data of the smart gas flowmeter, and determining the battery performance state of the smart gas flowmeter based on the average daily power consumption, the remaining power, and the power threshold, the battery reference runtime of the smart gas flowmeter can be more accurate.

In some embodiments, time thresholds may be different for different gas users. In some embodiments, the time threshold may be an empirical value, a default value, a preset value in advance, etc., or any combination thereof, which may be determined based on an actual need, and is not limited herein.

In some embodiments, the smart gas management platform may determine the time threshold based on the historical behavior data of the gas user.

The historical behavior data of the gas user means relevant data that may reflect a historical behavior of the gas user. The historical behavior data of the gas user may include historical bill payment information and historical feedback information of the gas user. For example, the historical bill payment information may be a count of arrears, a time of the arrears, or the like, and the historical feedback information may be a count of complaints, or the like.

In some embodiments, the smart gas management platform may obtain the historical behavior data of the gas user through an Internet of Things system for managing energy-saving early warning of a smart gas flowmeter.

In some embodiments, the smart gas management platform may preset a correspondence between the historical behavior data of the gas user and the time threshold and determine time thresholds corresponding to different historical behavior data by querying the correspondence.

In some embodiments, the smart gas management platform may determine a behavior score of the gas user based on the historical behavior data of the gas user; and determine the time threshold of the gas user based on the behavior score of the gas user. The lower the behavior score of the gas user, the larger the time threshold.

In some embodiments, the smart gas management platform may determine the behavior score of the gas user based on the historical behavior data of the gas user by means of a first scoring rule. For example, the first scoring rule may be the more the count of arrears of the gas user, the longer the time of the arrears, and the more the count of complaints, the lower the corresponding behavior score.

In some embodiments of the present disclosure, determining the time threshold based on the historical behavior data of the gas user can provide an early warning in advance based on a historical situation of the gas user, and reduce the count of complaints of the gas user due to impacted gas supply resulted by an insufficient power.

Some embodiments of the present disclosure issue the power alert to the gas user based on a relationship between a reference runtime and the time threshold, which can provide a timely warning about the power of the smart gas flowmeter and improve customer satisfaction.

Figure 4:
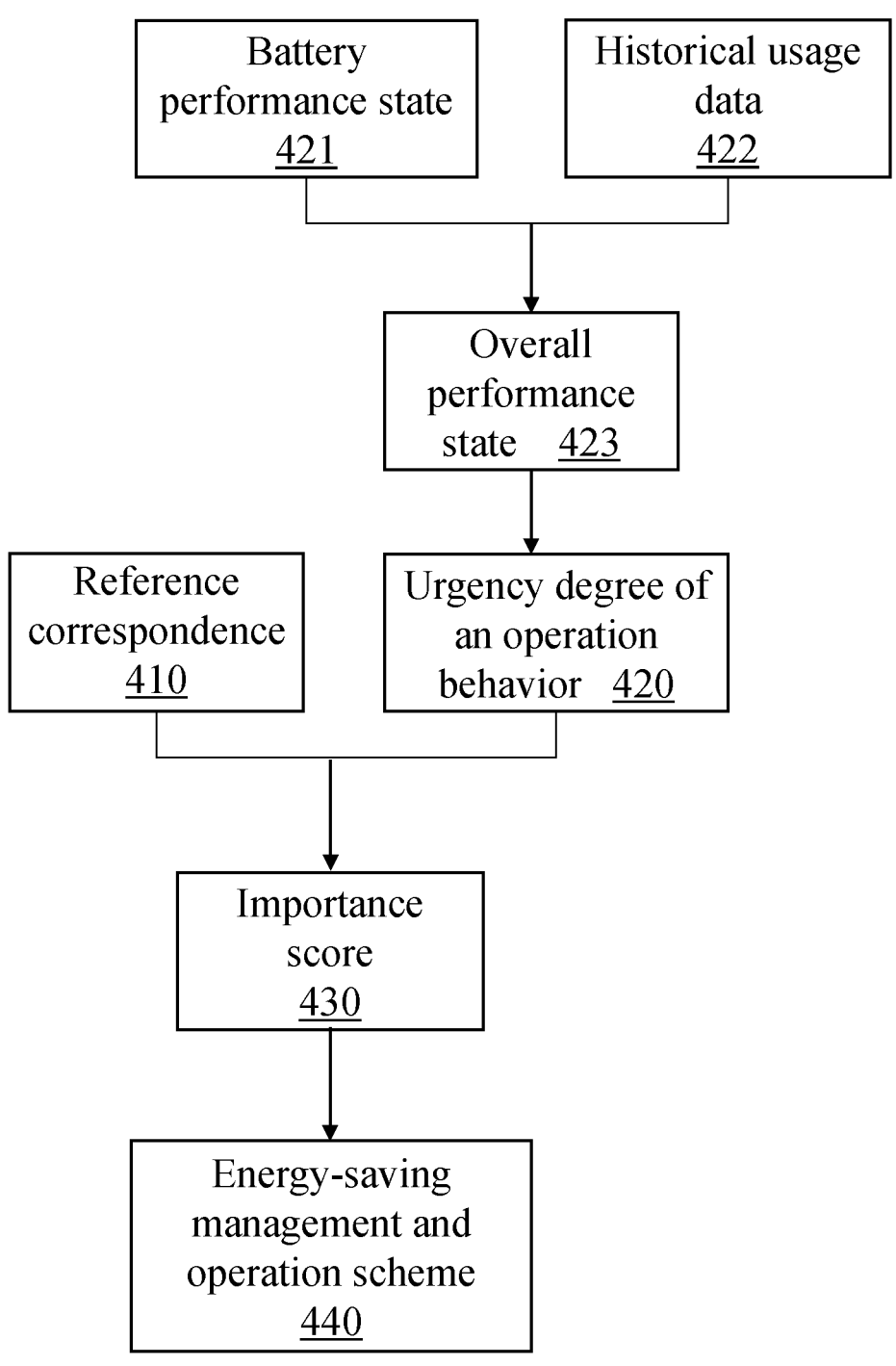
FIG. 4 is a schematic diagram illustrating an exemplary generation of an energy-saving management and operation scheme of a smart gas flowmeter according to some embodiments of the present disclosure.

FIG. 4 is a schematic diagram illustrating an exemplary generation of an energy-saving management and operation scheme of a smart gas flowmeter according to some embodiments of the present disclosure.

In some embodiments, a smart gas management platform may determine an importance score 430 of an operation behavior based on at least one reference correspondence 410 and an urgency degree of 420 of an operation behavior, and generate an energy-saving management and operation scheme 440 based on the importance score 430.

The urgency degree of an operation behavior is used to measure an emergency and importance of an operation behavior. The higher the urgency degree of an operation behavior, the more emergent and important the operation behavior is.

The urgency degree of an operation behavior may be predetermined by a technician based on experience and needs.

In some embodiments, the smart gas management platform may determine an overall performance state 423 of a smart gas flowmeter based on a battery performance state 421 of the smart gas flowmeter and historical usage data 422 of the smart gas flowmeter, and determine the urgency degree of an operation behavior 420 based on the overall performance state 423 of the smart gas flowmeter.

More details about the historical usage data of the smart gas flowmeter can be found in step 220 and the related descriptions thereof. More details about determining the battery performance state of the smart gas flowmeter can be found in FIG. 3 and the related descriptions thereof.

The overall performance state of the smart gas flowmeter is used to reflect a goodness degree of a current state of the smart gas flowmeter relative to a factory state. The better the overall performance state of the smart gas flowmeter, the closer the current state of the smart gas flowmeter is to the factory state.

In some embodiments, the overall performance state of the smart gas flowmeter may reflect a probability of failure of the smart gas flowmeter. For example, the worse the overall performance state of the smart gas flowmeter, the higher the probability of the failure of the smart gas flowmeter.

In some embodiments, the smart gas management platform may obtain a first state score corresponding to the battery performance state of the smart gas flowmeter and a second state score corresponding to the historical usage data of the smart gas flowmeter by scoring the battery performance state of the smart gas flowmeter and the historical usage data of the smart gas flowmeter, respectively, and determine the overall performance state of the smart gas flowmeter based on a weighted result of the first state score and the second state score.

In some embodiments, the smart gas management platform may determine the first state score and the second state score by presetting a second scoring rule. Exemplary second scoring rules may include that the worse the battery performance state of the smart gas flowmeter, the lower the first state score, and the longer the service life of the smart gas flowmeter and the more repairs, the lower the second state score.

In some embodiments, the smart gas management platform may directly determine the weighted result of the first state score and the second state score as the overall performance state of the smart gas flowmeter.

In some embodiments, the urgency degree of an operation behavior is negatively correlated to the overall performance state of the smart gas flowmeter. The worse the overall performance state of the smart gas flowmeter, the higher the urgency degree of an operation behavior.

By negatively correlating the urgency degree of an operation behavior to the overall performance state of the smart gas flowmeter, it is possible to prioritize the execution of a specific operation behavior when the overall performance state is worse (e.g., uploading fault-related data associated with a failure of the smart gas flowmeter) under a condition that the worse the overall performance state of the smart gas flowmeter is, the more likely the smart gas flowmeter may fail, and at this point, a higher urgency degree of an operation behavior for sending detected malfunctioning data can detect the failure in real-time.

The importance score of an operation behavior is a score that reflects an importance of the operation behavior. The higher the score, the higher the importance of the operation behavior.

In some embodiments, the smart gas management platform may determine the importance score of an operation behavior based on at least one reference correspondence and the urgency degree of an operation behavior. In some embodiments, the smart gas management platform may obtain a power consumption per unit time of the operation behavior based on one or more reference correspondences, determine a first score of the operation behavior through a first predetermined correspondence between the power consumption per unit time and the first score, determine a second score of the operation behavior through a second predetermined correspondence between the urgency degree of an operation behavior and the second score, and determine the importance score of an operation behavior by weighting and summing the first score and second score based on a predetermined weight. The first predetermined correspondence and the second predetermined correspondence may be preset by the system or by a human being.

In some embodiments, the smart gas management platform may generate an energy-saving management and operation scheme based on a score threshold and the importance score of an operation behavior. For example, one or more operation behaviors with an importance score higher than the score threshold may be identified as the energy-saving management and operation scheme. The score threshold may be preset by the system or by a human.

Some embodiments of the present disclosure generate the energy-saving management and operation scheme based on the urgency degree of an operation behavior of the operation behavior when a power alert is issued, which can prioritize the execution of an operation behavior with a high urgency degree in the case of a power emergency, make full use of a remaining power of the smart gas flowmeter, and improve the usage safety of the smart gas flowmeter.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. Accordingly, it should be emphasized and noted that "one embodiment" or "an embodiment", or "an alternative embodiment" referred to two or more times in different locations in the present disclosure do not necessarily refer to the same embodiment. In addition, certain features, structures, or characteristics of one or more embodiments of the present disclosure may be suitably combined.

In addition, unless expressly stated in the claims, the order of processing elements and sequences, the use of numerical letters, or the use of other names as described herein are not intended to limit the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or in a description thereof. However, this method of disclosure does not imply that more features are required for the objects of the present disclosure than are mentioned in the claims. Rather, claimed subject matter may lie in less than all features of a single foregoing disclosed embodiment.

Numbers describing the number of components, attributes, and properties are used in some embodiments, and it is to be understood that such numbers used in the description of embodiments are modified in some examples by the modifiers "about", "approximately", or "substantially". Unless otherwise noted, the terms "about," "approximate," or "substantially" indicate that a ±20% variation in the stated number is allowed. Correspondingly, in some embodiments, the numerical parameters used in the present disclosure and claims are approximations, which are subject to change depending on the desired characteristics of the individual embodiment. In some embodiments, the numerical parameters should take into account the specified number of valid digits and employ general place-keeping. While the numerical domains and parameters used to confirm the breadth of their ranges in some embodiments of the present disclosure are approximations, in specific embodiments, such values are set to be as precise as possible within a feasible range.

For each patent, patent application, patent application disclosure, and other material cited in the present disclosure, such as articles, books, specification sheets, publications, documents, etc., the entire contents of which are hereby incorporated herein by reference. Excluded are historical application documents that are inconsistent with or create a conflict with the contents of the present disclosure, as well as documents that limit the broadest scope of the claims of the present disclosure (currently or hereafter appended to the present disclosure). It should be noted that in the event of any inconsistency or conflict between the descriptions, definitions, and/or use of terminology in the materials appended to the present disclosure and those set forth herein, the descriptions, definitions and/or use of terminology in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for managing energy-saving early warning of a smart gas flowmeter, wherein the method is implemented by a smart gas management platform, and the method comprises:

obtaining a remaining power of the smart gas flowmeter;

determining a confidence level of the remaining power based on at least environmental data;

determining a calibrated power by calibrating the remaining power based on the confidence level;

determining whether to issue a power alert to a gas user based on the calibrated power, operation data of the smart gas flowmeter, and at least one reference correspondence, including:

presetting the at least one reference correspondence based on at least historical aggregate operation data of the smart gas flowmeter, wherein the reference correspondence represents a relationship between an operation behavior of the smart gas flowmeter and a power consumption;

determining a battery reference runtime of the smart gas flowmeter based on the calibrated power, the operation data, and the at least one reference correspondence; and issuing the power alert to the gas user in response to a determination that the battery reference runtime is less than a time threshold; and generating an energy-saving management and operation scheme of the smart gas flowmeter in response to a determination that the power alert is issued to the gas user.

2. The method of claim 1, wherein the determining a confidence level of the remaining power based on at least environmental data includes:

determining the confidence level by processing the environmental data and historical usage data of the smart gas flowmeter by using a confidence level determination model, the confidence level determination model being a machine learning model.

3. The method of claim 1, wherein the determining a battery reference runtime of the smart gas flowmeter based on the calibrated power, the operation data, and the at least one reference correspondence includes:

calculating an average daily power consumption of the gas user based on the operation data; and determining the battery reference runtime based on the average daily power consumption, the calibrated power, and a power threshold, the power threshold being determined based on a battery performance state of the smart gas flowmeter.

4. The method of claim 1, wherein the time threshold is determined based on historical behavioral data of the gas user.

5. The method of claim 1, wherein the presetting the at least one reference correspondence based on at least historical aggregate operation data of the smart gas flowmeter includes:

determining a power consumption per unit time for maintaining the smart gas flowmeter in operation based on the historical aggregate operation data; and determining a power consumption per unit of a remaining operation behavior based on an experimental test.

6. The method of claim 1, wherein the generating an energy-saving management and operation scheme of the smart gas flowmeter in response to a determination that the power alert is issued to the gas user includes:

determining an importance score of the operation behavior based on the at least one reference correspondence and an urgency degree of the operation behavior; and generating the energy-saving management and operation scheme based on the importance score.

7. The method of claim 3, wherein a determination of the battery performance state includes:

predicting the battery performance state by processing battery data of the smart gas flowmeter and the environmental data by using a prediction model, the prediction model being a machine learning model.

8. The method of claim 6, wherein a determination of the urgency degree of the operation behavior includes:

determining an overall performance state of the smart gas flowmeter based on the battery performance state of the smart gas flowmeter and historical usage data of the smart gas flowmeter; and determining the urgency degree of the operation behavior based on the overall performance state.

9. An Internet of Things system for managing energy-saving early warning of a smart gas flowmeter, comprising: a smart gas user platform, a smart gas service platform, a smart gas management platform, a smart gas sensor network platform, and a smart gas object platform interacting in sequence, wherein the smart gas management platform is configured to:

obtain a remaining power of the smart gas flowmeter;

determine a confidence level of the remaining power based on at least environmental data;

determine a calibrated power by calibrating the remaining power based on the confidence level;

determine whether to issue a power alert to a gas user based on the calibrated power, operation data of the smart gas flowmeter, and at least one reference correspondence, wherein to determine whether to issue the power alert to the gas user based on the calibrated power, the operation data of the smart gas flowmeter, and the at least one reference correspondence, the smart gas management platform is further configured to:

preset the at least one reference correspondence based on at least historical aggregate operation data of the smart gas flowmeter, wherein the reference correspondence represents a relationship between an operation behavior of the smart gas flowmeter and a power consumption;

determine a battery reference runtime of the smart gas flowmeter based on the calibrated power, the operation data, and the at least one reference correspondence; and issue the power alert to the gas user in response to a determination that the battery reference runtime is less than a time threshold; and generate an energy-saving management and operation scheme of the smart gas flowmeter in response to a determination that the power alert is issued to the gas user.

10. The system of claim 9, wherein the smart gas management platform is configured to:

determine the confidence level by processing the environmental data and historical usage data of the smart gas flowmeter by using a confidence level determination model, and the confidence level determination model is a machine learning model.

11. The system of claim 9, wherein the smart gas management platform is configured to:

calculate an average daily power consumption of the gas user based on the operation data; and determine the battery reference runtime based on the average daily power consumption, the calibrated power and a power threshold, and the power threshold is determined based on a battery performance state of the smart gas flowmeter.

12. The system of claim 9, wherein the time threshold is determined based on historical behavioral data of the gas user.

13. The system of claim 9, wherein the smart gas management platform is configured to:

determine a power consumption per unit time for maintaining the smart gas flowmeter in operation based on the historical aggregate operation data; and determine a power consumption per unit of a remaining operation behavior based on an experimental test.

14. The system of claim 9, wherein the smart gas management platform is configured to:

determine an importance score of the operation behavior based on the at least one reference correspondence and an urgency degree of the operation behavior; and generate the energy-saving management and operation scheme based on the importance score.

15. The system of claim 11, wherein a determination of the battery performance state includes:

predicting the battery performance state by processing battery data of the smart gas flowmeter and the environmental data by using a prediction model, and the prediction model is a machine learning model.

16. The system of claim 14, wherein a determination of the urgency degree of the operation behavior includes:

determining an overall performance state of the smart gas flowmeter based on a battery performance state of the smart gas flowmeter and historical usage data of the smart gas flowmeter; and determining the urgency degree of the operation behavior based on the overall performance state.

17. A computer-readable storage medium, wherein the storage medium stores computer instructions, and when a computer reads the computer instructions in the storage medium, the computer executes a method for managing energy-saving early warning of a smart gas flowmeter as claimed in claim 1.

\* \* \* \* \*